US008455368B2

(12) United States Patent
Chandler et al.

(10) Patent No.: US 8,455,368 B2
(45) Date of Patent: Jun. 4, 2013

(54) METHODS AND APPARATUS FOR ASSEMBLING AND OPERATING ELECTRONIC DEVICE MANUFACTURING SYSTEMS

(75) Inventors: Phil Chandler, San Francisco, CA (US); Daniel O. Clark, Pleasanton, CA (US); Robbert M. Vermeulen, Pleasant Hill, CA (US); Jay J. Jung, Sunnyvale, CA (US); Roger M. Johnson, Fremont, CA (US); Youssef A. Loldj, Sunnyvale, CA (US); James L. Smith, Chandler, AZ (US)

(73) Assignee: Applied Materials, Inc., Santa Clara, CA (US)

( * ) Notice: Subject to any disclaimer, the term of this patent is extended or adjusted under 35 U.S.C. 154(b) by 1057 days.

(21) Appl. No.: 12/126,922

(22) Filed: May 25, 2008

(65) Prior Publication Data
US 2008/0289167 A1 Nov. 27, 2008

Related U.S. Application Data

(60) Provisional application No. 60/931,731, filed on May 25, 2007, provisional application No. 61/026,432, filed on Feb. 5, 2005.

(51) Int. Cl.
*H01L 21/00* (2006.01)
(52) U.S. Cl.
USPC ............. 438/759; 95/149; 422/168; 438/905
(58) Field of Classification Search
USPC ............ 95/149, 41, 45, 47, 53, 54, 128, 131, 95/142; 29/428, 711; 422/95–96, 168–169; 55/385.1, 385.2; 96/4, 7, 108
See application file for complete search history.

(56) References Cited

U.S. PATENT DOCUMENTS 3,299,416 A 1/1967 Koppel
3,918,915 A 11/1975 Holler, Jr.
(Continued)

FOREIGN PATENT DOCUMENTS

WO WO 2005/121912 A1 12/2005
WO WO 2007/109082 A2 9/2007
(Continued)

OTHER PUBLICATIONS

International Search Report and Written Opinion of International Application No. PCT/US08/06585 mailed on Sep. 18, 2008.

(Continued)

*Primary Examiner* — Duane Smith
*Assistant Examiner* — Minh-Chau Pham
(74) *Attorney, Agent, or Firm* — Dugan & Dugan, PC (57) ABSTRACT

A method for operating one or more electronic device manufacturing systems is provided, including the steps 1) performing a series of electronic device manufacturing process steps with a process tool, wherein the process tool produces effluent as a byproduct of performing the series of process steps; 2) abating the effluent with an abatement tool; 3) supplying an abatement resource to the abatement tool from a first abatement resource supply; 4) changing an abatement resource supply from the first abatement resource supply to a second abatement resource supply, wherein changing the abatement resource supply comprises: i) interrupting a flow of the abatement resource from the first abatement resource supply; and ii) beginning a flow of the abatement resource from the second abatement resource supply; and 5) continuing to perform the series of process steps with the process tool, while changing, and after changing, the abatement resource supply.

9 Claims, 8 Drawing Sheets

U.S. PATENT DOCUMENTS

| | | | |
|---|---|---|---|
| 4,280,184 A | 7/1981 | Weiner et al. | |
| 4,701,187 A | 10/1987 | Choe et al. | |
| 4,720,807 A | 1/1988 | Ferran et al. | |
| 4,820,319 A | 4/1989 | Griffis | |
| 5,001,420 A * | 3/1991 | Germer et al. | 324/142 |
| 5,004,483 A | 4/1991 | Eller et al. | |
| 5,264,708 A | 11/1993 | Hijikata | |
| 5,470,390 A * | 11/1995 | Nishikawa et al. | 118/719 |
| 5,759,237 A * | 6/1998 | Li et al. | 95/41 |
| 5,910,294 A | 6/1999 | Langan et al. | |
| 5,976,222 A | 11/1999 | Yang et al. | |
| 6,195,621 B1 | 2/2001 | Bottomfield | |
| 6,277,347 B1 | 8/2001 | Stearns et al. | |
| 6,316,045 B1 | 11/2001 | Bernard et al. | |
| 6,419,455 B1 | 7/2002 | Rousseau et al. | |
| 6,468,490 B1 | 10/2002 | Shamouilian et al. | |
| 6,500,487 B1 | 12/2002 | Holst et al. | |
| 6,988,017 B2 | 1/2006 | Pasadyn et al. | |
| 7,294,155 B2 * | 11/2007 | Yudasaka | 29/25.01 |
| 7,569,790 B2 * | 8/2009 | Holber et al. | 219/121.41 |
| 2001/0008618 A1 * | 7/2001 | Comita et al. | 423/210 |
| 2003/0049182 A1 * | 3/2003 | Hertzler et al. | 422/168 |
| 2003/0154044 A1 | 8/2003 | Lundstedt et al. | |
| 2003/0194367 A1 | 10/2003 | Dunwoody et al. | |
| 2004/0001787 A1 | 1/2004 | Porshnev et al. | |
| 2004/0074846 A1 | 4/2004 | Stever et al. | |
| 2004/0144421 A1 | 7/2004 | Parce et al. | |
| 2004/0213721 A1 | 10/2004 | Arno et al. | |
| 2004/0255848 A1 | 12/2004 | Yudasaka | |
| 2005/0087298 A1 | 4/2005 | Tanaka et al. | |
| 2005/0109207 A1 | 5/2005 | Olander et al. | |
| 2005/0147509 A1 | 7/2005 | Bailey et al. | |
| 2005/0160983 A1 | 7/2005 | Sneh | |
| 2005/0163622 A1 | 7/2005 | Yamamoto et al. | |
| 2005/0177273 A1 | 8/2005 | Miyazaki et al. | |
| 2005/0207961 A1 | 9/2005 | Brooks et al. | |
| 2005/0209827 A1 | 9/2005 | Kitchin | |
| 2005/0233092 A1 | 10/2005 | Choi et al. | |
| 2005/0252884 A1 | 11/2005 | Lam et al. | |
| 2005/0283321 A1 | 12/2005 | Yue et al. | |
| 2006/0104878 A1 | 5/2006 | Chiu et al. | |
| 2006/0111575 A1 | 5/2006 | DeCourcy et al. | |
| 2006/0116531 A1 | 6/2006 | Wonders et al. | |
| 2006/0175012 A1 | 8/2006 | Lee | |
| 2007/0012402 A1 | 1/2007 | Sneh | |
| 2007/0060738 A1 | 3/2007 | DeBruin | |
| 2007/0079758 A1 | 4/2007 | Holland et al. | |
| 2007/0079849 A1 | 4/2007 | Hogle et al. | |
| 2007/0086931 A1 * | 4/2007 | Raoux et al. | 422/168 |
| 2007/0166205 A1 | 7/2007 | Holst et al. | |
| 2007/0256704 A1 | 11/2007 | Porshnev et al. | |
| 2007/0260343 A1 | 11/2007 | Raoux et al. | |
| 2008/0087217 A1 | 4/2008 | Yudasaka | |
| 2009/0216061 A1 | 8/2009 | Clark et al. | |
| 2009/0222128 A1 | 9/2009 | Clark et al. | |

FOREIGN PATENT DOCUMENTS

| | | |
|---|---|---|
| WO | WO 2007/109038 A2 | 9/2008 |
| WO | WO 2007/109081 A2 | 9/2008 |
| WO | WO 2008/147522 A1 | 12/2008 |
| WO | WO 2008/147523 A1 | 12/2008 |
| WO | WO 2008/147524 A1 | 12/2008 |
| WO | WO 2008/156687 A1 | 12/2008 |

OTHER PUBLICATIONS

International Search Report and Written Opinion of International Application No. PCT/US08/06586 mailed on Sep. 10, 2008.

International Search Report and Written Opinion of International Application No. PCT/US08/07428 mailed on Sep. 9, 2008.

International Search Report and Written Opinion of International Application No. PCT/US08/74937 mailed on Nov. 19, 2008.

International Search Report and Written Opinion of International Application No. PCT/US07/06495 mailed on Jul. 15, 2008.

International Search Report and Written Opinion of International Application No. PCT/US08/77082 mailed on Nov. 28, 2008.

International Search Report and Written Opinion of International Application No. PCT/US08/81230 mailed on Dec. 29, 2008.

Mooney et al., "Pump Predictive Diagnostics (online)", Solid State Technology, Jul. 2005, pp. 1-3.

"Conductance Calculations", Dec. 27, 2005, Kurt J. Lesker Company, pp. 1-3.

"Vacuum System Overview: Pressure, Mass-flow and Conductance", Mar. 15, 2004, pp. 1-10.

Office Action of U.S. Appl. No. 11/685,993 mailed Jun. 12, 2008.

Office Action of U.S. Appl. No. 11/686,012 mailed Nov. 16, 2007.

Final Office Action of U.S. Appl. No. 11/686,012 mailed May 21, 2008.

Office Action of U.S. Appl. No. 11/686,005 mailed Jul. 31, 2008.

Fireye CU-20 "Documentation for 45UV5 and 25SU3", May 1994.

International Search Report and Written Opinion of International Patent Application No. PCT/US2008/081098 mailed on Dec. 29, 2008.

International Search Report and Written Opinion of International Patent Application No. PCT/US08/06587 mailed on Aug. 29, 2008.

Search Report, European Patent Application No. EP 08 75 4674, mailed Jan. 13, 2013.

International Preliminary Report on Patentability and Written Opinion of International Application No. PCT/US2008/006585 mailed on Dec. 10, 2009.

* cited by examiner

METHODS AND APPARATUS FOR ASSEMBLING AND OPERATING ELECTRONIC DEVICE MANUFACTURING SYSTEMS

The present application claims priority to U.S. Provisional Patent Application Ser. No. 60/931,731, filed May 25, 2007 and entitled "Methods and Apparatus for Abating Effluent Gases Using Modular Treatment Components", which is hereby incorporated herein by reference in its entirety for all purposes.

The present application also claims priority to U.S. Provisional Patent Application Ser. No. 61/026,432 filed Feb. 5, 2008 and entitled "Abatement Systems", which is hereby incorporated herein by reference in its entirety for all purposes.

FIELD OF THE INVENTION

The present invention relates generally to electronic device manufacturing methods and systems, and is more particularly directed to methods and apparatus for assembling and operating such systems.

BACKGROUND OF THE INVENTION

Electronic device manufacturing systems, such as process tools and abatement tools, etc., may be complex assemblies of subsystems or components, and each component may itself be a complex system. Typically, assembly of an electronic device manufacturing system may take a significant amount of time. In addition, prior to being placed into service, an assembled system, and many subsystems must be separately tested to determine whether each meets industry standards. The certification process adds to the amount of time required to ship an electronic device manufacturing system.

Furthermore, such systems produce a valuable product. When a system is out of service due to the maintenance requirements of a component of the system or of a supporting sub-system, the manufacturer may have to forego significant revenues due to product which is not being manufactured while the system is out of service. The same is true of a manufacturer which is waiting for delivery of a new system.

Methods and apparatus for simplifying and reducing the build/test time of electronic device manufacturing systems and for keeping such systems in operation, despite the need to take a component or sub-system out of service, are desirable.

SUMMARY OF THE INVENTION

In one aspect, a method for operating one or more electronic device manufacturing systems is provided, including the steps 1) performing a series of electronic device manufacturing process steps with a process tool, wherein the process tool produces effluent as a byproduct; 2) abating the effluent with an abatement tool; 3) supplying an abatement resource to the abatement tool from a first abatement resource supply; 4) changing an abatement resource supply from the first abatement resource supply to a second abatement resource supply, wherein changing the abatement resource supply comprises: i) interrupting a flow of the abatement resource from the first abatement resource supply; and ii) beginning a flow of the abatement resource from the second abatement resource supply; and 5) continuing to perform the series of process steps with the process tool, while changing, and after changing, the abatement resource supply.

In a second aspect, a method for assembling an electronic device manufacturing system is provided, including the steps 1) stocking one or more pre-certified, modular, electronic device manufacturing system components; 2) identifying performance requirements of the electronic device manufacturing system; 3) selecting one or more of the stocked components to satisfy the performance requirements; 4) constructing the electronic device manufacturing system from components which comprise one or more of the stocked components; and 5) certifying the constructed electronic device manufacturing system.

In a third aspect, an electronic device manufacturing system is provided, including 1) a process tool; 2) an abatement tool; 3) a first abatement resource supply, containing an abatement resource; and 4) a second abatement resource supply, containing the abatement resource, wherein the second abatement resource supply is adapted to flow the abatement resource to the abatement tool after a flow of the abatement resource from the first abatement resource supply is interrupted.

Numerous other aspects are provided in accordance with these and other aspects of the invention. Other features and aspects of the present invention will become more fully apparent from the following detailed description, the appended claims and the accompanying drawings.

DETAILED DESCRIPTION OF THE INVENTION

As described above, electronic device manufacturing systems may be complex assemblies. Typically, a system may include a process tool having process chambers which perform process steps such as deposition, epitaxial growth, etching, cleaning, etc., and an abatement tool. Abatement tools may consist of combinations of subsystems or components which may be designed to perform different abatement functions. The terms subsystems and components may be used interchangeably herein. The subsystems from which an abatement tool may be constructed include, but are not limited to, thermal reactors, burn boxes, catalytic units, plasma units, filters, water scrubbers, absorbing and adsorbing units, acid gas scrubbers, etc.

One method of constructing a system for a customer may include determining the nature of the system required by the customer, identifying the subsystems which will be required to construct the system, constructing the subsystems, and then constructing the system from the subsystems. This can be a time-consuming process, especially in light of the rigorous certifications which electronic device manufacturing systems, and subsystems, must undergo before being put into service. It is possible, of course, to pre-build systems so that a system may be delivered promptly to a customer, but the diversity of available systems combined with the high cost of systems may make such a practice prohibitively expensive.

After a customer has begun using a system, the subsystems which make up the system may eventually require routine maintenance, troubleshooting or removal from the system for some other reason. One known method of performing maintenance on and/or troubleshooting a subsystem, is to take the entire system out of service so that the subsystem may be maintained or inspected in a safe, non-polluting manner. Once the problem has been diagnosed and fixed or preventive maintenance has been performed on the subsystem, the system may be put back into service. When a system is out of service, however, the customer cannot make product with the system. It is thus desirable to be able to continue operating a system while a subsystem is off-line.

The present invention provides methods and apparatus which may reduce the time between identifying a customer's needs and delivering a suitable system to the customer. The invention may also enable a customer to remove a subsystem from the system and repair or replace the subsystem without the need to shut down the system and interrupt production.

In some embodiments of the invention, a manufacturer of electronic device manufacturing systems may identify a number of subsystems which are frequently incorporated into systems, and then build, pre-certify and stock an appropriate number of systems. When a customer places an order and the customer's needs have been identified, the manufacturer may then construct a system in a shorter period of time, because one or more of the subsystems which may be required in the system will be stocked and pre-certified, allowing the manufacturer to simply connect the subsystem into a system frame. In these and other embodiments of the invention, the subsystems may be modular, e.g., constructed with standard connectors in standard locations, so that the subsystems may be easily and quickly fit together in various configurations.

In some embodiments of the invention, a system may be constructed such that one or more of its subsystems may be disconnected from the system without the need to shut down the system. For example, a system may typically be supplied with a resource such as water. In some of these embodiments, pipes which carry the water from a water supply to the system may include valves and a connector. The valves and the connector may enable an operator to disconnect the water supply from the system and may prevent water from flowing out of the supply or back out from the system. In these embodiments, the system may be provided with an alternate water supply, or be designed to operate without the water supply for a period of time sufficient to connect a new water supply.

Figure 1:
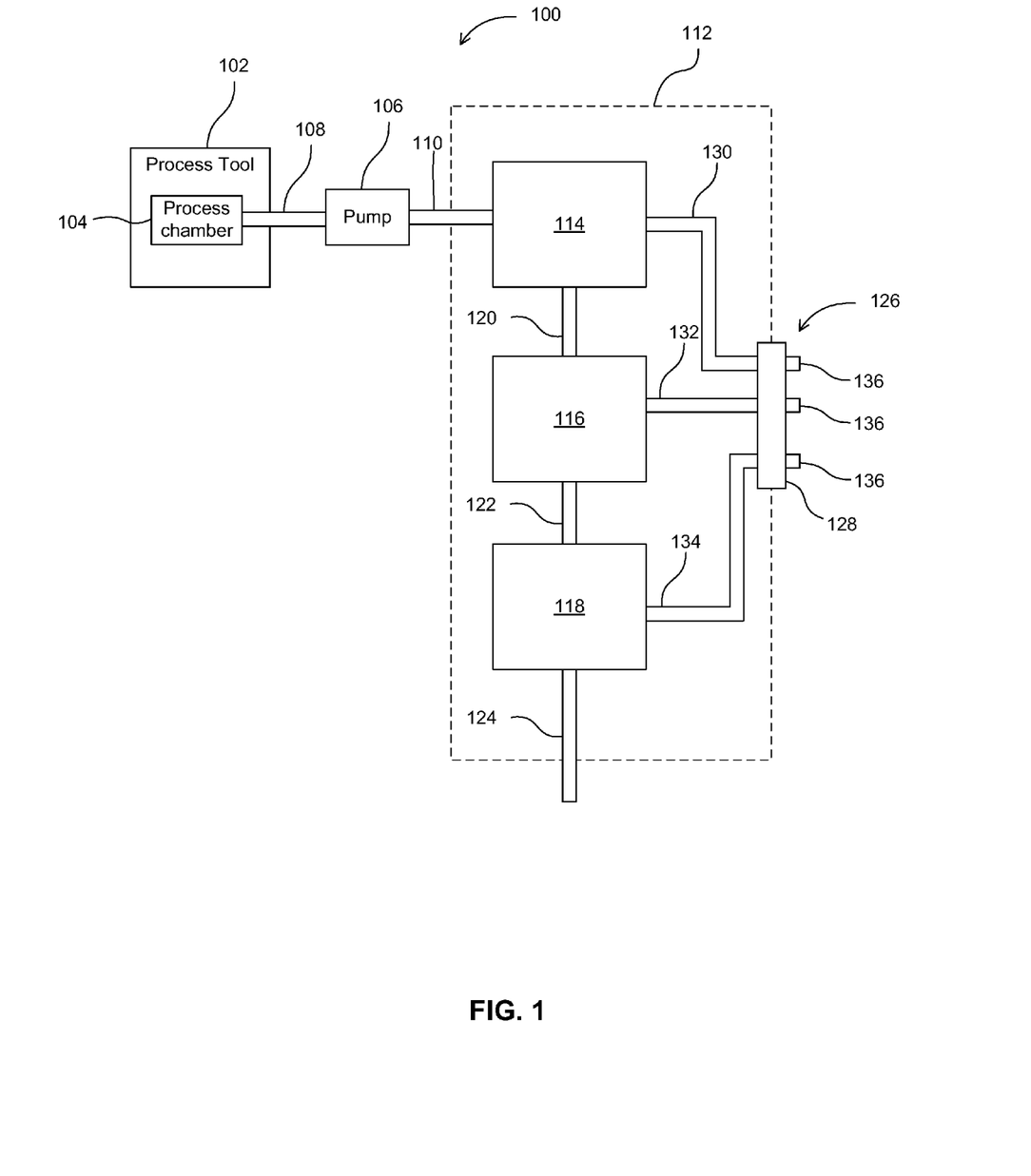
FIG. 1 is a schematic drawing of a first embodiment of an electronic device manufacturing system of the present invention.

FIG. 1 is a schematic drawing of an electronic device manufacturing system 100 of the present invention. System 100 may include a process tool 102. The process tool 102 may include one or more process chambers 104. In fact, a process tool 102 may typically include up to six or more process chambers 104. The process chambers 104 may perform any of the functions typically performed by process chambers 104, including, for example, deposition, epitaxial growth, etching, cleaning, etc. Each process chamber 104 may produce effluent which may be pumped out of the process chamber 104 by vacuum pump 106 through conduit 108. Effluent which is pumped out of process chamber 104 may be pumped through conduit 110 and into abatement tool 112, and, more specifically, into abatement module 114 of abatement tool 112. The nature of the effluent which may be produced by the process chamber 104 is discussed in more detail below.

The abatement tool 112 may consist of one or more abatement modules 114, 116, 118. Although the abatement tool 112 is shown having three abatement modules, it is to be understood that fewer or more modules may be used.

The abatement modules 114, 116, 118 may be the same or different abatement equipment or subsystems, such as thermal reactors, burn boxes, catalytic units, plasma units, filters, water scrubbers, absorbing and adsorbing units, cooling chambers, acid-gas scrubbers, etc., or any other suitable abatement equipment which is, or may become, available. The abatement modules may be selected and then concatenated in any appropriate order to effect abatement of the effluent which is produced by the one or more process chambers 104. The effluents which may be produced by the one or more process chambers 14 may include metals, acids, flammable or explosive gases, greenhouse gases, and other noxious, dangerous, or otherwise undesirable compounds. One of ordinary skill in the art of electronic device manufacturing system effluent abatement will be able select an appropriate combination and order of abatement modules to provide effective abatement of the effluent which may be exhausted from the one or more process chambers 104.

The abatement modules 114, 116, 118 may be connected to each other by conduits 120, 122. Abatement module 118 may be connected by conduit 124 to a further abatement system (not shown), to a house exhaust system (not shown) or to the atmosphere.

Electronic device manufacturing system 100 may further include an abatement resource connection system 126 which may include a connection panel 128 and abatement resource conduits 130, 132, 134. Abatement resource panel 128 may include abatement resource connectors 136, to which conduits (not shown) connected to abatement resource supplies (not shown) may be connected. While abatement resource panel 128 is shown having three connectors in communication with three conduits 130, 132, 134, it should be understood that abatement resource panel 128 may have fewer or more connectors. For example, a typical abatement system may require abatement resources such as fuel or power, water, one or more reagents, clean dry air, and inert gas, etc. The same may be true for each individual abatement module, such as abatement modules 114, 116, 118. Depending upon the nature of a particular abatement module, it may require one or more of the abatement resources listed above.

The abatement resource panel 128 may have in a number of different configurations. For example on a side of abatement resource panel 128 which is exterior to the abatement system 112, abatement resource panel 128 may have a single abatement resource connector for each type of abatement resource which may be used by abatement system 112. Alternatively, abatement resource panel 128 may have three abatement resource connectors for each abatement resource on the exterior side, e.g., one for each abatement module for each abatement resource which may be used by abatement system 112. On the inside of abatement system 112, the abatement resource panel 128 may have a connector (not shown) for each conduit 130, 132, 134, for each abatement resource connected to the exterior of abatement resource panel 128. Thus, for example, if a particular abatement system 112 were connected to three abatement resources, there may be three abatement resource connectors 136 on the exterior of abatement resource panel 128 and three times three, or nine, connectors (not shown) on the interior side of abatement resource panel 128. It is to be understood that there may be more or fewer abatement resources than three used by the abatement system 112, just as there may be more or fewer than three abatement modules included in the abatement system 112.

In operation, the process tool 102 may perform electronic device manufacturing steps within process chamber 104. During and after the manufacturing steps, effluent may be evacuated from process chamber 104 by vacuum pump 106 and introduced into the abatement system 112. Within abatement system 112, the effluent may be treated in abatement modules 114, 116, 118 to render the effluent acceptable for eventual release to the atmosphere. For example, abatement modules 114, 116, 118 may be used to remove particulate matter from the effluent, to neutralize acid gases, to oxidize dangerous, harmful or undesirable compounds, and to remove water soluble chemicals for further treatment in liquid form, etc. Other suitable treatments may be employed. Following treatment in abatement tool 112, the effluent may pass through conduit 124 as described above. During the abatement of the effluent in abatement modules 114, 116, 118, the abatement modules may receive abatement resources from abatement resource supplies (not shown) through connection panel 128 and conduits 130, 132, 134. The abatement modules 114, 116, 118, may use the abatement resources to abate the effluent.

Figure 2:
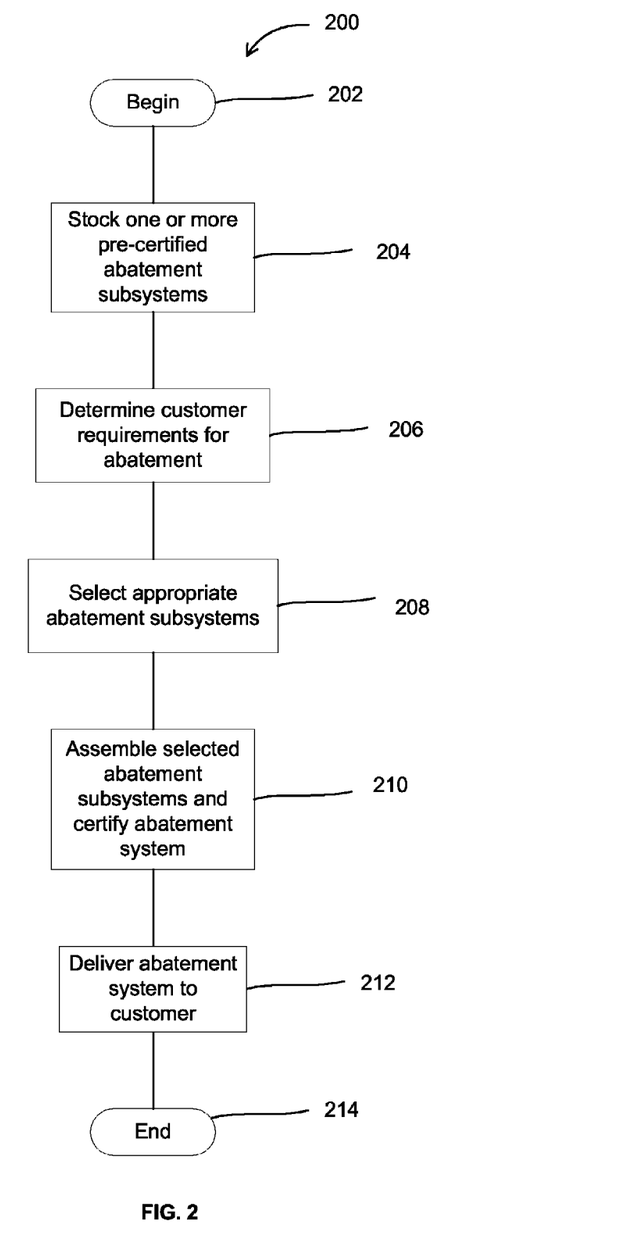
FIG. 2 is a flow chart depicting a method of designing and constructing the electronic device manufacturing system of FIG. 1.

FIG. 2 is a flow chart depicting a method 200 of designing and constructing an electronic device manufacturing system of FIG. 1. Method 200 begins in step 202. In step 204, an electronic device manufacturing system manufacturer may select one or more abatement subsystems which are frequently incorporated into abatement systems, construct one or more of each selected abatement subsystem, certify each constructed abatement subsystem and place the certified abatement subsystem in stock. In an alternate embodiment, an electronic device manufacturing system constructor, who may not build abatement subsystems, may purchase and stock one or more pre-certified abatement subsystems. In step 206, the manufacturer or constructor may determine a customer's requirements for an abatement system. In step 208, the manufacturer or constructor may select appropriate abatement subsystems. In step 210, the manufacturer or constructor may assemble the selected abatement subsystems, using at least one stocked, pre-certified abatement subsystem, and then certify the constructed abatement system. In step 212 the abatement system may be delivered to the customer. Method 200 ends in step 214. The stocking of certified abatement subsystems may enable the manufacturer to deliver abatement systems in a shorter period of time.

Figure 3:
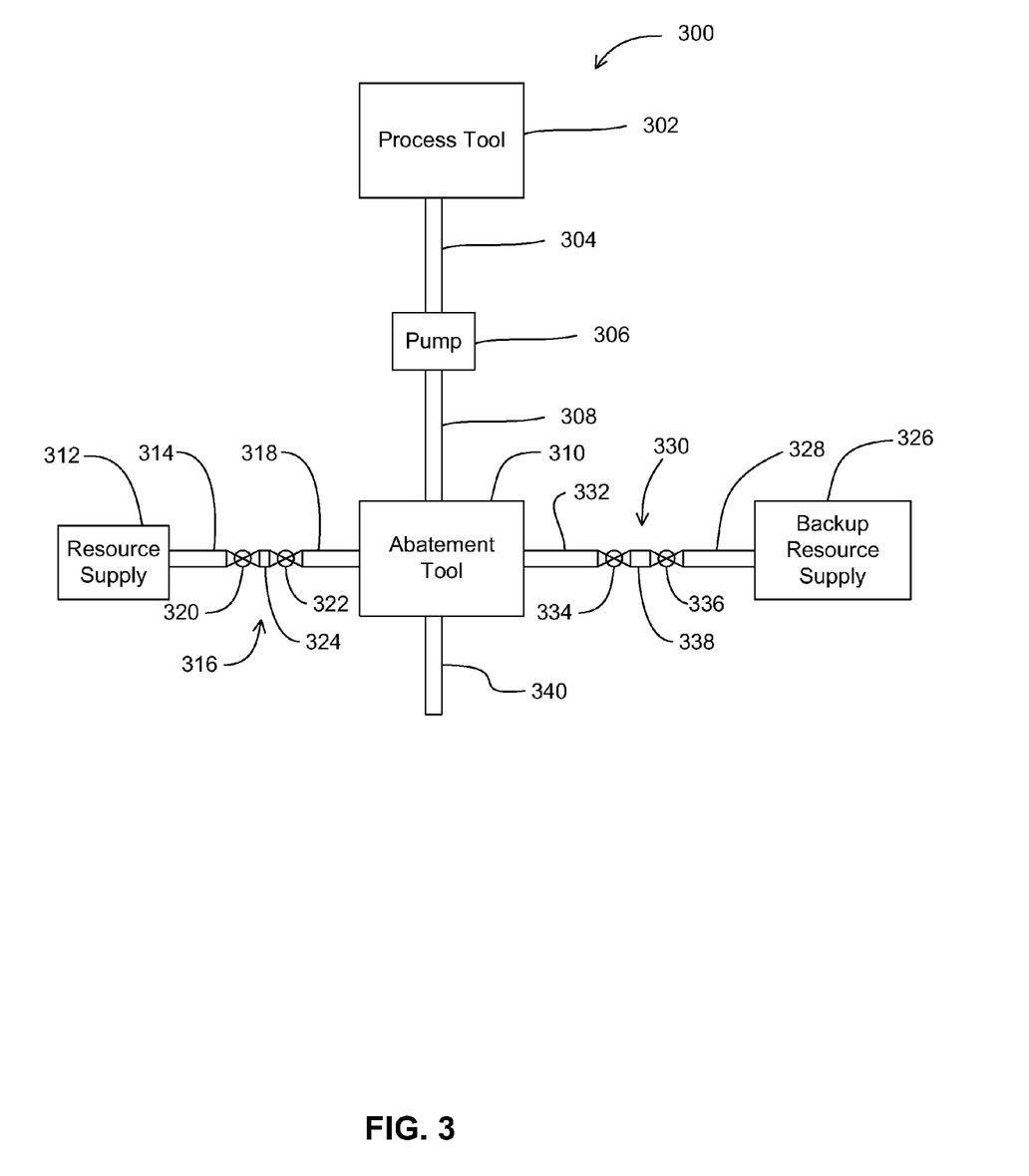
FIG. 3 is a schematic drawing of a second embodiment of an electronic device manufacturing system of the present invention.

FIG. 3 is a schematic drawing of a second embodiment of an electronic device manufacturing system 300 of the present invention. System 300 may include a process tool 302 which may be connected through conduit 304 to vacuum pump 306. Vacuum pump 306 may, in turn, be connected through conduit 308 to abatement tool 310. Abatement tool 310 may be in fluid connection with abatement resource supply 312 through conduit 314, valve assembly 316, and conduit 318. Valve assembly 316 may include two shut off valves, 320, 322 which may be connected by connector 324. This valve design may enable an operator to prevent the flow of fluids from the abatement resource supply 312 through conduit 314 and also prevent any back flow of fluids from the abatement tool 310 through conduit 318. The connector 324 may enable the operator to disconnect the abatement resource supply 312 from the system 300. Any suitable valve assembly may be utilized.

System 300 may also include an backup abatement resource supply 326, which may contain the same abatement resource as is contained by abatement resource supply 312. The backup abatement resource supply 326 may be in fluid connection with abatement tool 310 through conduit 328, valve assembly 330, and conduit 332. Valve assembly 330, like valve assembly 316, may include two shut off valves, 334, 336 which may be connected through connector 338. Abatement tool 310 may be connected through conduit 340 to further treatment (not shown), the house exhaust (not shown) or directly to the atmosphere.

In operation, process tool 302 may exhaust effluent through conduit 304, through vacuum pump 306, through conduit 308 and into abatement tool 310, which may be adapted to abate the effluent. Abatement tool 310 may receive an abatement resource from abatement resource supply 312. The abatement resource may flow from abatement resource supply 312 through conduit 314, valve assembly 316, conduit 318, and into abatement tool 310. Abated effluent may then flow from abatement tool 310 through conduit 340 and into a house exhaust (not shown), to further treatment (not shown), or directly to the atmosphere. Backup abatement resource supply 326 may contain the same abatement resource as is contained by abatement resource supply 312. In the event that the abatement resource from abatement resource supply 312 is no longer available to abatement tool 310, abatement tool 310 may receive the abatement resource from backup abatement resource supply 326. The abatement resource from backup abatement resource supply 326 may flow through conduit 328, valve assembly 330, and conduit 332 into abatement tool 310. The function of valve assemblies 316 and 330 will be described in more detail below with reference to FIG. 4.

Figure 4:
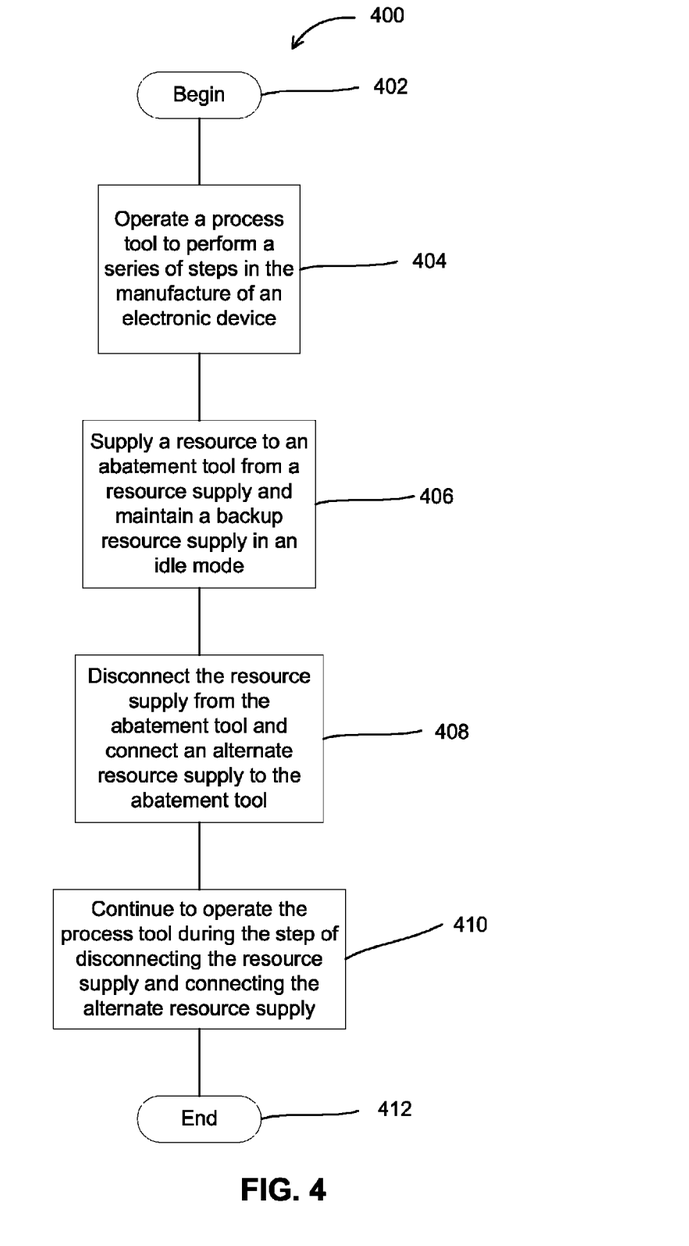
FIG. 4 is a flow chart depicting a method of operating the electronic device manufacturing system of FIG. 3.

FIG. 4 is a flow chart which depicts a method 400 of operating the electronic device manufacturing system 300 of FIG. 3. In some embodiments, method 400 may provide a method for replacing an abatement resource supply 312 with a backup abatement resource supply 326, without interrupting the operation of the process tool 302. In some embodiments, the system 300 may include a backup abatement resource supply 326 which may be available solely to system 300 as a backup abatement resource supply to abatement resource supply 312.

Method 400 begins with step 402. In step 404, a process tool 302 is operated to perform a series of steps in the manufacture of an electronic device. In step 406, an abatement resource flows to an abatement tool 310 from an abatement resource supply 312, and a backup abatement resource 326 is kept idle as the backup abatement resource supply to supply 312. The abatement resource is used by the abatement tool 310 to abate effluent from the process tool 302.

In step 408 the source of the abatement resource is changed from the abatement resource supply 312 to the backup abatement resource supply 326. During the operation of the process tool 302 and the abatement tool 310, there may come a time when the abatement resource supply 312 encounters a problem, or must be taken out of service for preventive maintenance or for some other reason. If it becomes necessary to take the abatement resource supply 312 out of service, an operator or a controller may disconnect the abatement resource supply 312 from the abatement tool 310, and the operator, or controller, may connect the backup abatement resource supply 326 so that abatement tool 310 does not suffer an interruption of abatement resource.

The step 408 of disconnecting the abatement resource supply may include the following steps. With reference to FIG. 3, valves 320, 322 may be turned to a closed position to prevent any further flow of abatement resource from conduit 314 and to prevent any backflow of abatement resource or other contents of the abatement tool 310 through conduit 318. At, or approximately at, the same time the backup abatement resource supply 326 may be connected to the abatement tool 310 by opening valves 334, 336. After valves 320, 322 have been closed the connector 324 may be disconnected and the abatement resource supply 312 may be removed for service and/or troubleshooting. Any other suitable method may be used to disconnect the abatement resource supply 312 and connect the backup abatement resource supply 326.

In step 410, the operation of the process tool 302 is not interrupted during the steps of disconnecting the abatement resource supply 312 and connecting the alternate abatement resource supply 326. In step 412, method 400 ends.

Figure 5:
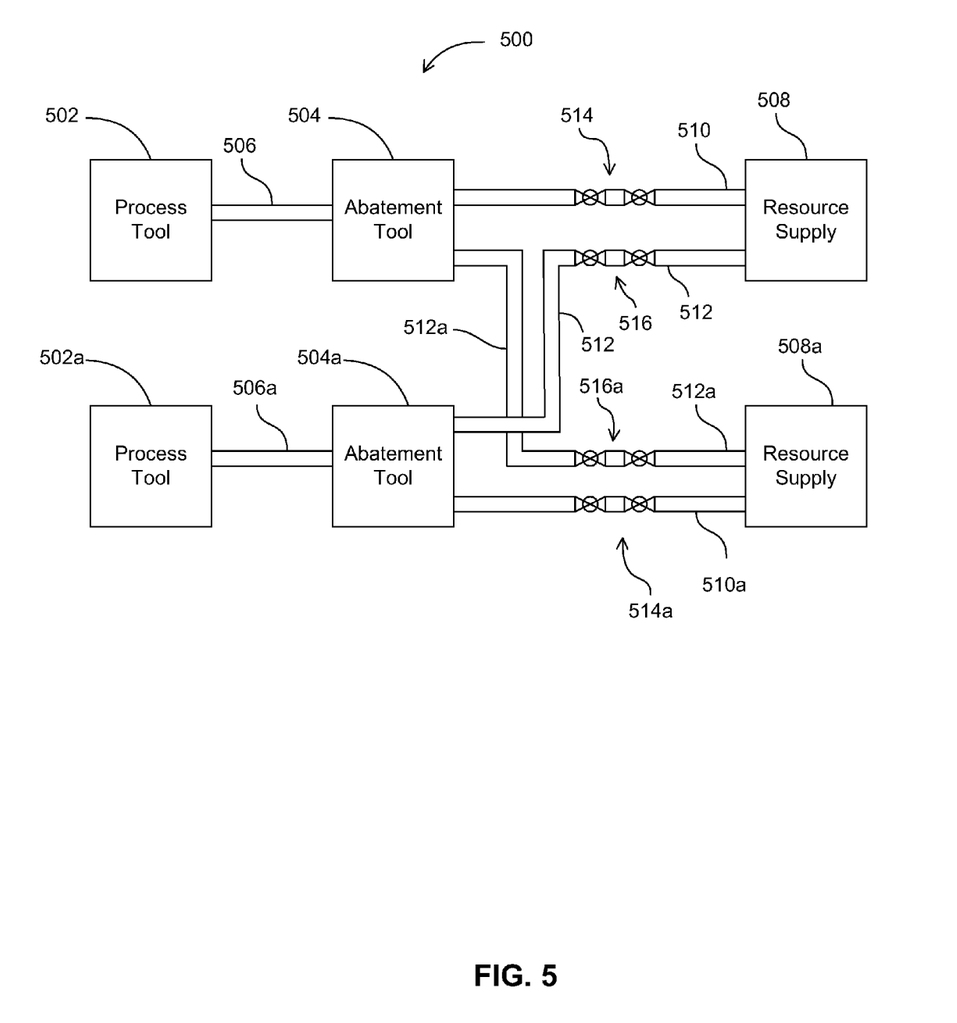
FIG. 5 is a schematic drawing of a third embodiment of an electronic device manufacturing system of the present invention.

FIG. 5 is a schematic drawing of a third embodiment of an electronic device manufacturing system 500 of the present invention. System 500 may include process tools 502, 502a. Process tools 502, 502a may be connected to abatement tools 504, 504a, respectively, by conduits 506, 506a, respectively. Abatement resource supplies 508, 508a may be primary abatement resource supplies to abatement tools 504, 504a, respectively. In some embodiments, abatement resource supply 508 may supply the abatement resource to the abatement tool 504 through primary conduit 510. Similarly, abatement resource supply 508a may supply the same abatement resource to abatement tool 504a through primary conduit 510a.

Secondary conduit 512 may connect to abatement resource supply 508 to abatement tool 504a. Likewise, secondary conduit 512a may connect abatement resource supply 508a to abatement tool 504.

Each of the primary conduits 510, 510a and secondary conduits 512, 512a may contain valve assemblies 514, 514a and 516, 516a, respectively. The valve assemblies, and their operation on a valve assembly level, were discussed in detail with respect to FIG. 3, and that valve assembly level description applies equally to the valve assemblies depicted in FIG. 5.

Although a system 500 with only two parallel process tool/abatement tool/abatement resource supply lines has been depicted in FIG. 5, it is to be understood that three or more parallel process tool/abatement tool/abatement resource supply lines may be utilized.

It will be understood, for some abatement resources, that for every conduit which carries the abatement resource to an abatement tool there must be a return conduit. Return conduits are not shown in any of the figures herein for the sake of clarity.

In operation, process tools 502, 502a of system 500 may produce effluent which may flow through conduits 506, 506a, respectively to abatement tools 504, 504a, respectively, were the effluent may be abated. The abatement tools 504, 504a in turn, may receive abatement resources from abatement resource supplies 508, 508a, respectively. Abatement resource supplies 508, 508a may be designed with sufficient capacity such that upon one of the abatement resource supplies becoming non-operational, the remaining operational abatement resource supply may be selected to supply abatement resource to both abatement tools 504, 504a. This may enable the process tools 502, 502a to continue operating while the non-operational abatement resource supply is being replaced or repaired.

In some embodiments, during normal operation, secondary conduits 512, 512a may be unselected and remain closed so that no abatement resource may flow through the secondary conduits. Under circumstances where one of the abatement resource supplies 508, 508a becomes unavailable, the secondary conduit, connecting the still available abatement resource supply to the abatement tool whose primary abatement resource supply has become unavailable, may be selected. Upon selection, the valve assembly in the secondary conduit may be opened to allow the flow of abatement resource through the secondary conduit. For example, if abatement resource supply 508a were to become unavailable, secondary conduit 512 may be selected and valve assembly 516 placed in an open configuration. These actions would allow abatement resource to flow from abatement resource supply 508 through conduit 512 to abatement tool 504a.

If one of the abatement resource supplies must be removed from the system 500, the valve assemblies of the primary and secondary conduits which emanate from the abatement resource supply may be placed in the closed configuration and the connector portion of the valve assemblies may be disconnected. See FIG. 3 for a description of the operation of the valve assemblies. For example, if abatement resource supply 508 must be removed from system 500, valve assembly 514 and valve assembly 516 may be placed in the closed configuration. Thereafter, the valve assemblies may be disconnected so that the abatement resource supply 508 may be removed from the system 500. Of course, prior to the removal of abatement resource supply 508, valve assembly 516a may be placed in the open configuration so that abatement resource supply 508a may supply abatement resource through conduit 512a to abatement tool 504.

Figure 6:
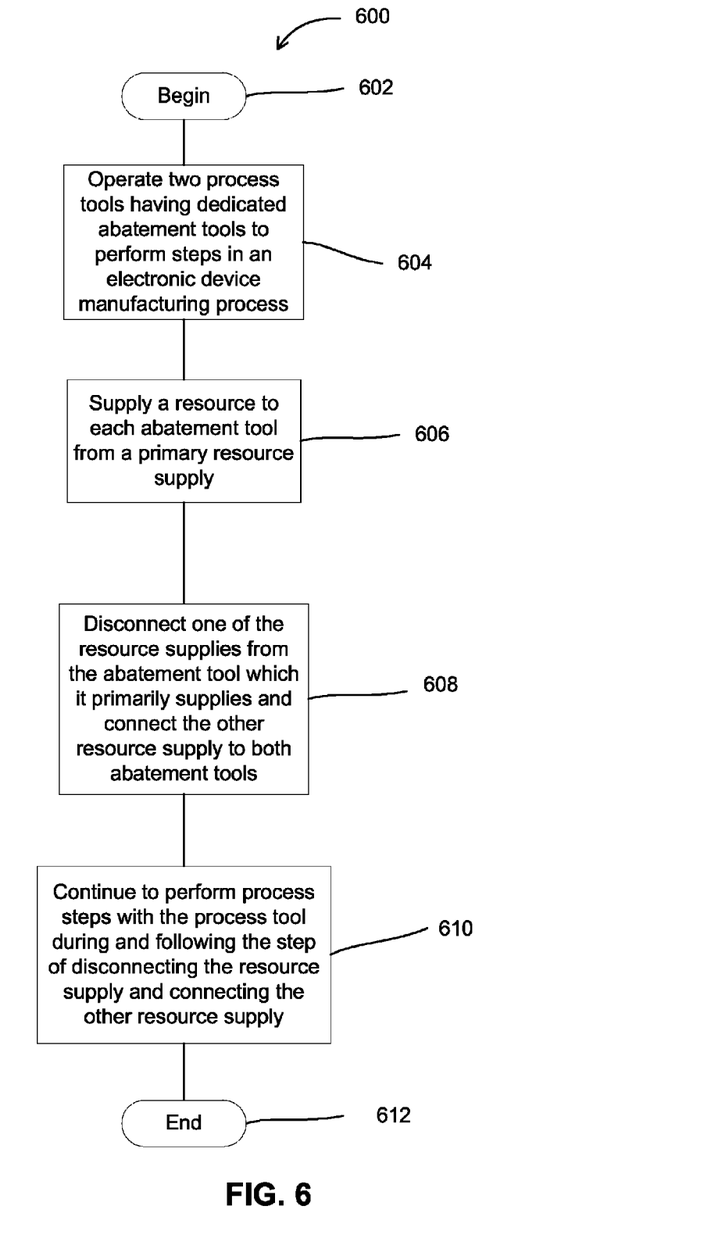
FIG. 6 is a flow chart depicting a method of operating the electronic device manufacturing system of FIG. 5.

FIG. 6 is a flow chart depicting a method 600 of operating the electronic device manufacturing system of FIG. 5. Method 600 takes advantage of the configuration of the system 500, wherein extra capacity may be built into resource supplies 508, 508a so that upon the unavailability of one of the resource supplies the other the resource supply may be used to provide a backup resource capability to other abatement tool in the system 500. As described above, the system 500 may include more than two parallel lines.

Method 600 begins in step 602. In step 604, process tools 502, 502a, having dedicated abatement tools 504, 504a, are operated to perform steps in the manufacture of electronic device. In step 606, each abatement tool is supplied with the abatement resource from an abatement resource supply which is the primary supply for that abatement tool. For example, in FIG. 5, abatement tool 504 is primarily supplied by abatement resource supply 508, and abatement tool 504a is primarily supplied by abatement resource supply 508a. This may be accomplished by configuring valves 514, 514a in the open position, and by configuring valves 516, 516a in the closed position.

In step 608, a first abatement resource supply is disconnected from the abatement tool which the first abatement resource supply primarily supplies. At, or about, the same time, a second abatement resource supply is connected to both abatement tools. Excess capacity built in to the abatement resource supplies enables one of the supplies to supply two abatement tools, at least for a limited time period. In step 610, the process tools 502, 502a are operated both during and after the step of disconnecting the abatement resource supply and connecting the other abatement resource supply. Method 600 ends in step 612.

Figure 7:
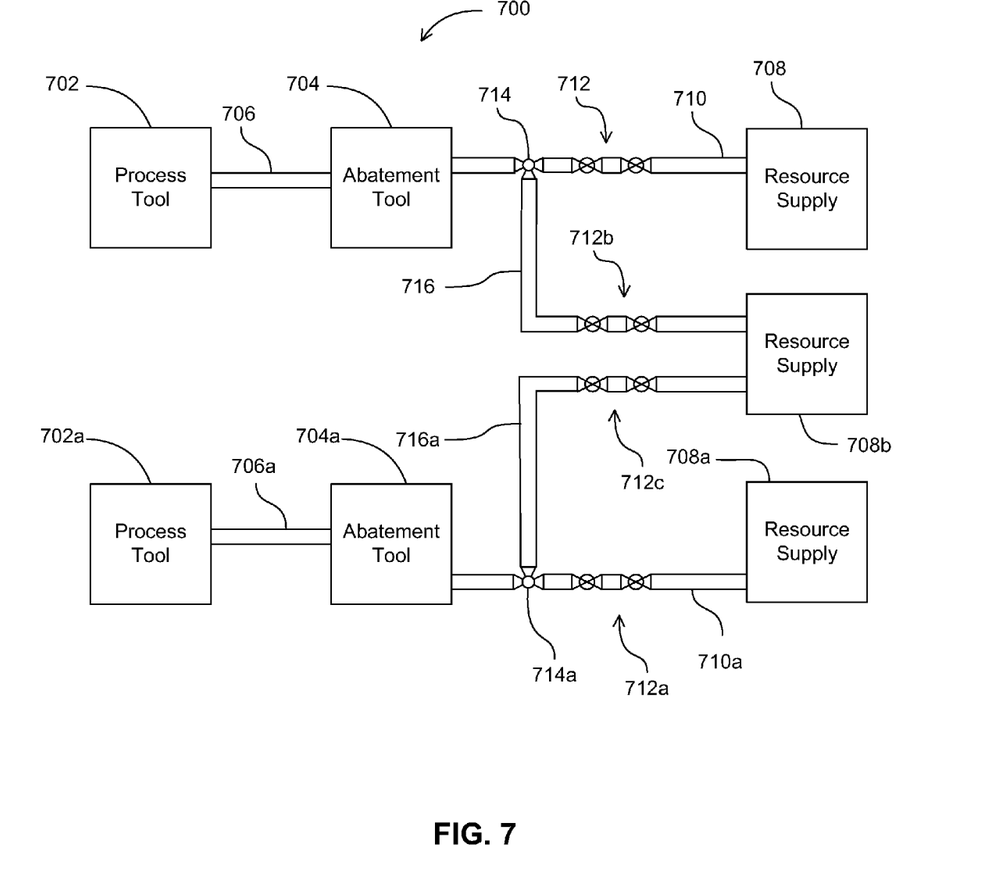
FIG. 7 is a schematic drawing of a fourth embodiment of an electronic device manufacturing system of the present invention.

FIG. 7 is a schematic drawing of a fourth embodiment of an electronic device manufacturing system 700 of the present invention. System 700 may include process tools 702, 702a which may be connected to abatement tools 704, 704a by conduits 706, 706a. In some embodiments, for any particular abatement resource, each abatement tool may have a primary abatement resource supply for that abatement resource. In FIG. 7, for example, abatement tool 704 may receive an abatement resource from abatement resource supply 708 through conduit 710, valve assembly 712, and valve 714. Likewise, abatement tool 704a may receive the abatement resource from abatement resource supply 708a through conduit 710a valve assembly 712a and valve 714a. Resource supply 708b may be configured as a backup abatement resource supply, and may be connected to both abatement tools 704 and 704a through conduits 716 and 716a respectively.

In operation, process tools and 702, 702a may produce effluent which may flow through conduits 706, 706a and into abatement tools 704, 704a, where the effluent may be abated. Abatement tools 704, 704a may use an abatement resource supplied by primary abatement resource supplies 708, 708a, respectively. Under normal operating circumstances, abatement resource supply 708b may not be in fluid connection with any abatement tools and may be considered a spare abatement resource supply. By "not in fluid connection" is meant, for example, that valve assemblies 712b, 712c may be in a closed configuration, or that valves some 714 and 714a may be configured to prevent fluid flow from abatement resource supply 708b. However, in the event that one or more of primary abatement resource supplies 708, 708a should become inoperative or otherwise be taken out of service, abatement resource supply 708b may be connected to one or more abatement tools for which the primary abatement resource supply has become unavailable. The selection and switch over from one abatement resource supply to another may be accomplished through a series of valves such as valve assemblies 712, 712a, 712b, and 712c, in conjunction with three-way valves 714 and 714a. Thus for example if abatement resource supply 708 should become unavailable the valves may be operated to disconnect abatement resource supply 708 from fluid communication with abatement tool 704 and place abatement resource supply 708b in fluid communication with abatement tool 704. This may be accomplished by placing valve assembly 712 in a closed configuration, by placing valve assembly 712b in an open configuration, and by placing three-way valve 714 in a configuration which enables abatement resource flowing through conduit 716 to flow into abatement tool 704. While abatement resource supplies 708 is disconnected from system 700, abatement resource supply 708 may be repaired or maintained.

Figure 8:
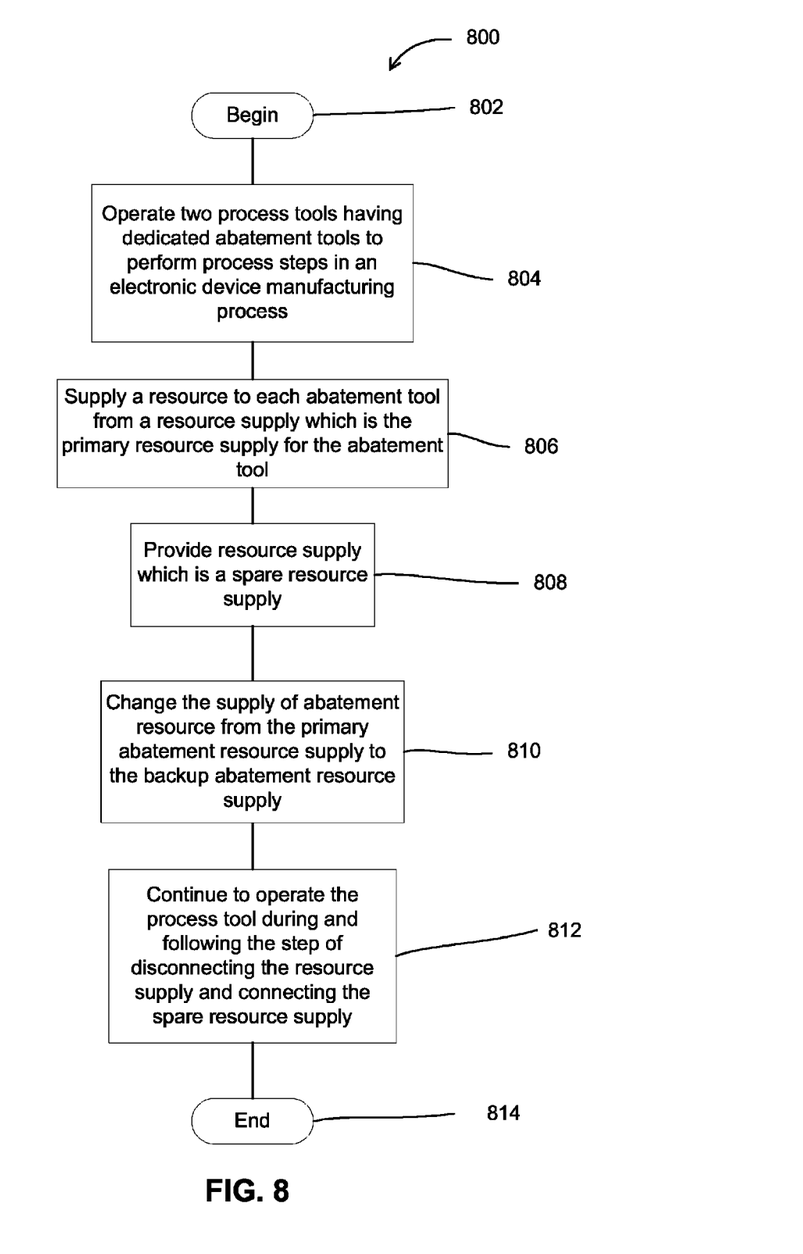
FIG. 8 is a flow chart depicting a method of operating the electronic device manufacturing system of FIG. 7.

FIG. 8 is a flow chart depicting a method 800 of operating the electronic device manufacturing system of FIG. 7. Method 800 makes use of a backup abatement resource supply 708b which is connected to more than one abatement tool 704, 704b. Backup abatement tool 708b is idle during normal operation, and is available to serve as a backup abatement resource supply to any of the abatement tools 704, 704b to which it is connected. Although system 700 is shown with only two parallel process tool/abatement tool/abatement resource supply lines, it is to be understood that three or more parallel process lines may be used.

Method 800 begins with step 802. In step 804 two process tools 702, 702a having dedicated abatement tools 704, 704a are operated to perform steps in an electronic device manufacturing process. In step 806, each abatement tool 704, 704a receives an abatement resource from a primary abatement resource supply, respectively. In step 808, a backup abatement resource supply is provided for use when a primary abatement resource supply may become unavailable, but is kept idle until it is needed as a backup resource supply. In step 810, the supply of abatement resource is changed from one of the primary abatement resource supplies 708, 708a to the backup abatement resource supply 708b. In step 812, the process tools are operated to perform electronic device manufacturing process steps both during and following step 810 where the primary abatement resource supply is disconnected and the spare abatement resource supply is connected to the abatement tool. The method 800 ends in step 814.

The foregoing description discloses only exemplary embodiments of the invention. Modifications of the above disclosed apparatus and methods which fall within the scope of the invention will be readily apparent to those of ordinary skill in the art. For example, the invention has been described with respect to abatement system components, but may be practiced with other electronic device manufacturing systems and subsystems, including, but not limited to, blowers, pumps, chillers, process chemical delivery systems, entire abatement systems, cooling towers, cryogenic pumps, etc. These systems and subsystems may have extra capacity which can be used for backup, can be duplicated to have dedicated backup, or act as a backup for a group of similar components.

Accordingly, while the present invention has been disclosed in connection with exemplary embodiments thereof, it should be understood that other embodiments may fall within the spirit and scope of the invention, as defined by the following claims.

The invention claimed is:

1. A method for operating one or more electronic device manufacturing systems comprising:
    performing a series of electronic device manufacturing process steps with a process tool, wherein the process tool produces effluent as a byproduct;
    abating the effluent with an abatement tool;
    supplying an abatement resource to the abatement tool from a first abatement resource supply;
    changing an abatement resource supply from the first abatement resource supply to a second abatement resource supply, wherein the second abatement resource supply is a backup supply to the first abatement resource supply and wherein changing the abatement resource supply comprises:
    interrupting a flow of the abatement resource from the first abatement resource supply; and
    beginning a flow of the abatement resource from the second abatement resource supply; and
    continuing to perform the series of process steps with the process tool, while changing, and after changing, the abatement resource supply, wherein prior to the changing of the abatement resource supply
    the first abatement resource supply is used as a primary abatement resource supply for a first abatement tool; and
    the second abatement resource supply is used as a primary abatement resource supply for a second abatement tool and a backup supply to the primary abatement resource supply of the first abatement resource supply; and
    after the changing of the abatement resource supply the first abatement resource supply is idle; and
    the second abatement resource supply is used as both the primary abatement resource supply for the second abatement tool and as a secondary abatement resource supply for the first abatement tool at the same time.

2. The method of claim 1 wherein the abatement resource is at least one of fuel, power, oxidant, clean dry air, water, cooling medium, inert gas, ambient air, and an acid neutralizer.

3. The method of claim 1 wherein prior to the changing of the abatement resource supply the second abatement resource supply is idle; and the second abatement resource supply is available to function as a secondary abatement resource supply for two or more abatement tools; and after the changing of the abatement resource supply the first abatement resource supply is idle; and the second abatement resource supply is used as the secondary supply for one or more of the abatement tools.

4. The method of claim 1 or 3 wherein a controller operates a system of valves to interrupt the flow of the abatement resource from the first abatement resource supply and wherein the controller operates a system of valves to begin the flow of the abatement resource from the second abatement resource supply.

5. A method for assembling an electronic device manufacturing system comprising:

stocking one or more pre-certified, modular, abatement subsystems;

identifying performance requirements of the abatement subsystem;

selecting one or more of the stocked components to satisfy the performance requirements;

constructing the abatement subsystem from components which comprise one or more of the stocked components; and certifying the constructed abatement subsystem for inclusion in said electronic device manufacturing system.

6. The method of claim 5 wherein the stocked components further comprise components of an abatement tool.

7. The method of claim 5 further comprising the step of constructing a modular, abatement subsystem.

8. The method of claim 5 further comprising the step of pre-certifying the abatement subsystem.

9. A method for operating one or more electronic device manufacturing systems comprising:

performing a series of electronic device manufacturing process steps with at least two process tools, wherein the at least two process tools produce effluent as a byproduct;

abating the effluent from a first process tool with a first abatement tool and abating the effluent from a second process tool with a second abatement tool;

supplying a first abatement resource to the first abatement tool from a first abatement resource supply and supplying a second abatement resource to the second abatement tool from a second abatement resource supply, wherein the first and second abatement resources are the same type of resource;

changing the abatement resource supply from at least one of the first abatement resource supply and the second abatement resource supply to a third abatement resource supply, wherein the third abatement resource supply is contains the same resource as the first and second resource supplies and is connected to both the first abatement tool and the second abatement tool serving simultaneously as a backup supply to the first and second abatement resource supplies and wherein changing the abatement resource supply comprises:

interrupting a flow of at least one of the first and second abatement resources from the first and second abatement resource supplies; and beginning a flow of the abatement resource from the third abatement resource supply; and continuing to perform the series of process steps with the first and second process tools, while changing, and after changing, the abatement resource supply.

\* \* \* \* \*